United States Patent
Borst et al.

(10) Patent No.: US 7,132,149 B2
(45) Date of Patent: *Nov. 7, 2006

(54) DATA STORAGE MEDIUM AND METHOD FOR THE PREPARATION THEREOF

(75) Inventors: Keith M. Borst, Scotia, NY (US); Robert R. Gallucci, Mt. Vernon, IN (US); Charles D. Iacovangelo, Clifton Park, NY (US); Donald G. LeGrand, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/638,094

(22) Filed: Aug. 7, 2003

(65) Prior Publication Data

US 2004/0062944 A1 Apr. 1, 2004

Related U.S. Application Data

(60) Provisional application No. 60/405,611, filed on Aug. 23, 2002.

(51) Int. Cl.
*B32B 3/02* (2006.01)
*G01D 15/34* (2006.01)
*B05D 5/06* (2006.01)

(52) U.S. Cl. ............ 428/64.4; 428/64.5; 428/64.6; 428/64.7; 428/65.1; 428/626; 428/336; 428/339; 428/412; 428/413; 428/419; 428/457; 428/651; 428/652; 428/657; 428/660; 428/668; 428/686; 428/913; 427/162; 346/135.1; 526/256; 526/258; 526/266; 526/318; 525/461

(58) Field of Classification Search .............. 428/64.4, 428/65.5, 64.6, 64.7, 65.1, 624, 626, 336, 428/339, 412–413, 419, 457, 651–652, 657, 428/660, 668, 686, 913, 64.5; 526/256, 258, 526/266, 318; 525/461; 427/162; 346/135.1
See application file for complete search history.

(56) References Cited

U.S. PATENT DOCUMENTS

| | | | |
|---|---|---|---|
| 2,999,835 A | 9/1961 | Goldberg | |
| 3,153,008 A | 10/1964 | Fox | |
| 3,169,121 A | 2/1965 | Goldberg | |
| 3,306,874 A | 2/1967 | Hay | |
| 3,306,875 A | 2/1967 | Hay | |
| 3,334,154 A | 8/1967 | Kim | |
| 3,642,946 A | 2/1972 | Grabowski et al. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White | |

(Continued)

FOREIGN PATENT DOCUMENTS

| | | |
|---|---|---|
| CA | 2099852 A1 | 1/1994 |
| CA | 2099854 A1 | 1/1994 |

(Continued)

OTHER PUBLICATIONS

ASTM D 1003–00 Standard Test Method for Haze and Luminous Transmittance of Transparent Plastics (6 pgs).

(Continued)

*Primary Examiner*—Ling Xu
(74) *Attorney, Agent, or Firm*—Louis A. Piccone

(57) ABSTRACT

A data storage medium includes a haze-prevention layer between a heat-resistant thermoplastic substrate and a reflective metal layer. The haze-prevention layer includes a metal having a tensile modulus of at least about $15 \times 10^6$ pounds per square inch. The data storage medium resists hazing of the reflective layer at elevated temperatures.

16 Claims, 1 Drawing Sheet

U.S. PATENT DOCUMENTS

| | | | |
|---|---|---|---|
| 3,983,093 | A | 9/1976 | Williams et al. |
| 4,001,184 | A | 1/1977 | Scott |
| 4,011,200 | A | 3/1977 | Yonemitsu et al. |
| 4,038,343 | A | 7/1977 | Yonemitsu et al. |
| 4,123,436 | A | 10/1978 | Holub et al. |
| 4,131,575 | A | 12/1978 | Adelmann et al. |
| 4,156,069 | A | 5/1979 | Prevorsek et al. |
| 4,210,841 | A | 7/1980 | Vodicka et al. |
| 4,363,844 | A | 12/1982 | Lewis et al. |
| 4,490,228 | A | 12/1984 | Bodin et al. |
| 4,638,335 | A * | 1/1987 | Smith et al. ............. 346/135.1 |
| 4,663,421 | A | 5/1987 | Mark |
| 4,754,128 | A | 6/1988 | Takeda et al. |
| 4,937,691 | A * | 6/1990 | Narayan et al. ......... 360/97.01 |
| 4,942,073 | A | 7/1990 | Era et al. |
| 5,034,458 | A | 7/1991 | Serini et al. |
| 5,045,344 | A | 9/1991 | Pinkhasov |
| 5,118,573 | A | 6/1992 | Tawara et al. |
| 5,297,132 | A | 3/1994 | Takano et al. |
| 5,330,852 | A | 7/1994 | Gerstenberg et al. |
| 5,378,284 | A | 1/1995 | Geisler et al. |
| 5,447,767 | A | 9/1995 | Tanabe et al. |
| 5,503,934 | A | 4/1996 | Maas et al. |
| 5,512,416 | A | 4/1996 | Namba et al. |
| 5,525,379 | A | 6/1996 | Takada et al. |
| 5,589,280 | A | 12/1996 | Gibbons et al. |
| 5,783,653 | A | 7/1998 | Okamoto et al. |
| 5,849,087 | A | 12/1998 | Kloberdanz et al. |
| 5,982,546 | A | 11/1999 | Kawamoto et al. |
| 6,110,544 | A | 8/2000 | Yang et al. |
| 6,183,829 | B1 | 2/2001 | Daecher et al. |
| 6,261,694 | B1 | 7/2001 | Iacovangelo |
| 6,347,016 | B1 | 2/2002 | Ishida et al. |
| 6,355,723 | B1 | 3/2002 | van Baal et al. |
| 6,379,757 | B1 | 4/2002 | Iacovangelo |
| 6,397,776 | B1 | 6/2002 | Yang et al. |
| 6,436,503 | B1 | 8/2002 | Cradic et al. |
| 6,520,650 | B1 | 2/2003 | Frazier et al. |
| 6,596,366 | B1 | 7/2003 | Ohno |
| 2002/0034603 | A1 * | 3/2002 | Nee ........................ 428/64.1 |
| 2002/0048691 | A1 | 4/2002 | Davis et al. |
| 2002/0094455 | A1 | 7/2002 | Feist et al. |
| 2002/0197438 | A1 | 12/2002 | Hay et al. |
| 2003/0044564 | A1 | 3/2003 | Dris et al. |

FOREIGN PATENT DOCUMENTS

| | | |
|---|---|---|
| EP | 0 745 872 A2 | 12/1996 |
| EP | 0 747 460 A1 | 12/1996 |
| JP | 63108540 A | 5/1988 |
| JP | 63201929 A | 8/1988 |
| JP | 01232553 A | 9/1989 |
| JP | 02312020 A | 12/1990 |
| JP | 03248337 A | 11/1991 |
| JP | 04177632 A | 6/1992 |

OTHER PUBLICATIONS

ASTM D 523–89 (Reapproved 1999) Standard Test Method fo Specular Gloss (5 pgs).

Kirk–Othmer, Encyclopedia of Chemical Technology, Second Edition, vol. 16, pp. 272–281 (1968).

U.S. Appl. No. 10/638,099, filed Aug. 7, 2003, Gallucci et al.

U.S. Appl. No. 10/638,100, filed Aug. 7, 2003, Borst et al.

U.S. Appl. No. 10/638,145, filed Aug. 7, 2003, Gallucci et al.

International Search Report; International Application No. PCT/US2004/024850; International Filing Date Mar. 8, 2004; Date of Mailing: Jun. 12, 2004 (8 pages).

Y.Barrell et al., "Expanding Thermal Plasma for Fast Deposition of Scratch–Resistant SiCxHyOz Films", Surface and Coatings Technology 180–181 (2004) 367–371.

M.F.A.M. van Hest doctoral thesis, "High Rate Deposition of Silicone Oxide Like Films" pp. 95–108, 133–154, 167–169 (2002).

JP60203489; Oct. 15, 1985; Abstract Only (1 page).

JP61286801; Dec. 17, 1986; Abstract Only (1 page).

JP63108540A; May 13, 1988; Abstract Only (2 pgs).

JP63201929A; Aug. 22, 1988; Abstract Only (2 pgs).

JP01232553A; Sep. 18, 1989; Abstract Only (2 pgs).

JP02312020A; Dec. 27, 1990; Abstract Only (2 pgs).

JP03248337A; Nov. 6, 1991; Abstract Only (2 pgs).

JP04177632A; Jun. 24, 1992; Abstract Only (1 pg).

* cited by examiner

DATA STORAGE MEDIUM AND METHOD FOR THE PREPARATION THEREOF

CROSS REFERENCE TO RELATED APPLICATIONS

This application claims priority to U.S. Provisional Application Ser. No. 60/405,611, filed Aug. 23, 2002.

BACKGROUND OF THE INVENTION

Reflective articles comprising a thermoplastic substrate and a reflective metal layer are currently employed in a variety of product applications, including automotive headlight reflectors and data storage media (e.g., data storage discs). Such articles may perform well at ambient temperatures, but at the elevated temperatures encountered in certain manufacturing and use conditions, their reflectivity may be impaired by the formation of haze in the reflective coating.

There is therefore a need for reflective articles that maintain their reflectivity at elevated temperatures.

BRIEF DESCRIPTION OF THE INVENTION

One embodiment is a reflective article exhibiting improved heat-resistance, comprising: a substrate comprising an amorphous thermoplastic resin having a heat distortion temperature of at least about 140° C. measured at 66 pounds per square inch (psi) according to ASTM D648; a reflective metal layer; and a haze-prevention layer interposed between the substrate and the reflective metal layer, wherein the haze-prevention layer comprises a metal having a tensile modulus of at least about $15 \times 10^6$ pounds per square inch measured at 25° C. according to ASTM D638.

Other embodiments, including a method of preparing the reflective article, are described in detail below.

DETAILED DESCRIPTION OF THE INVENTION

Figure 1:
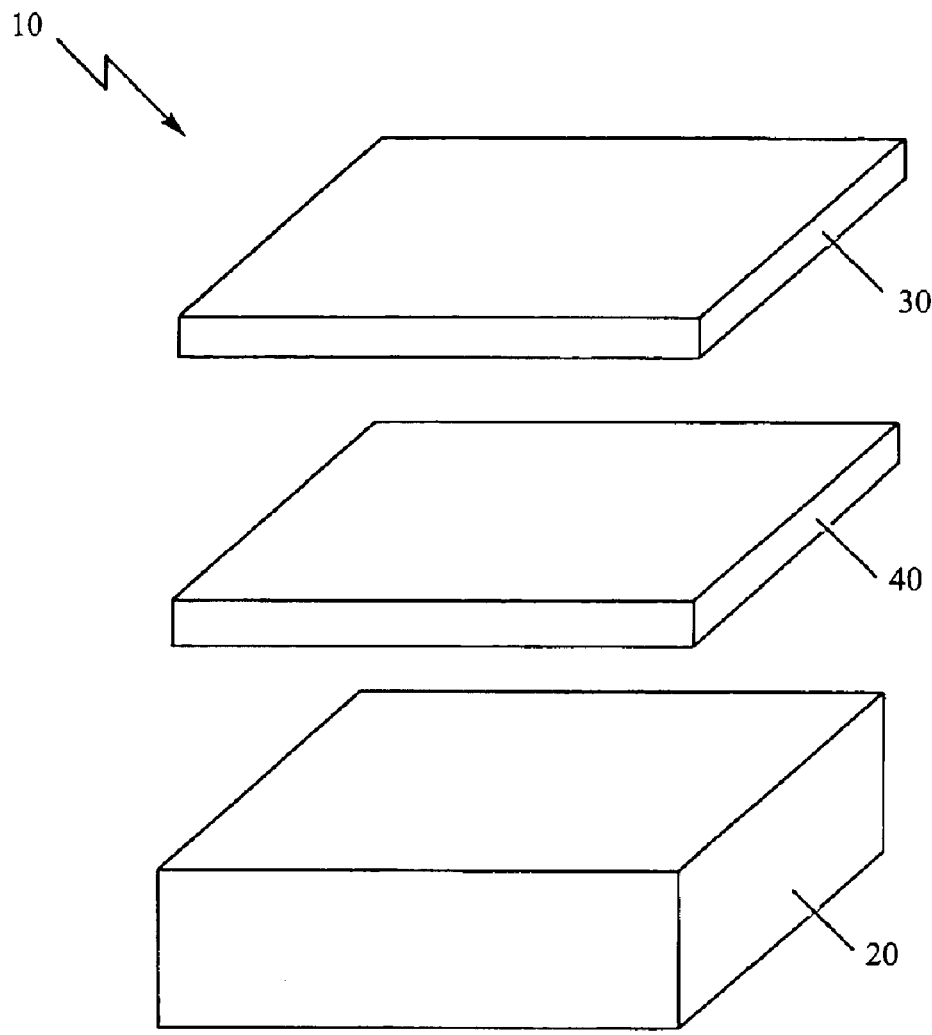
FIG. 1 is an exploded view of a reflective article 10 comprising a thermoplastic substrate 20, a reflective metal layer 30, and a haze-prevention layer 40.

One embodiment is a data storage medium, comprising: a substrate comprising an amorphous thermoplastic resin having a heat distortion temperature of at least about 140° C. measured at 66 psi according to ASTM D648; a reflective metal layer; and a haze-prevention layer interposed between the substrate and the reflective metal layer, wherein the haze-prevention layer comprises a metal having a tensile modulus of at least about $15 \times 10^6$ pounds per square inch measured at 25° C. according to ASTM D638.

During the commercial development of reflectors for automotive headlights, it was sometimes observed that reflectors prepared by direct metalization of a thermoplastic substrate would initially exhibit excellent reflectivity, but under conditions of use, hazing of the reflective surface would occur, leading to failure of the part. Through extensive research on a variety of materials, the present inventors have discovered that haze-formation under high-temperature conditions can be reduced or eliminated by interposing between the thermoplastic substrate and the reflective metal layer a haze-prevention layer having a tensile modulus of at least about $15 \times 10^6$ pounds per square inch measured at 25° C. according to ASTM D638. As described in detail below, a variety of materials are suitable for fabricating the haze-prevention layer, but they are united in their mechanical characteristics.

The substrate comprises an amorphous thermoplastic resin having a heat distortion temperature of at least about 140° C., preferably at least about 170° C., more preferably at least about 185° C., still more preferably at least about 200° C., measured at 66 psi according to ASTM D648. Suitable thermoplastic resins include, for example, polyetherimides, polyetherimide sulfones, polysulfones, polyethersulfones, polyphenylene ether sulfones, poly(arylene ether)s, polycarbonates, polyester carbonates, polyarylates, and the like, and mixtures thereof. These thermoplastics and methods for their preparation are known in the art.

Preferred polyetherimides include those comprising structural units of the formula (I)

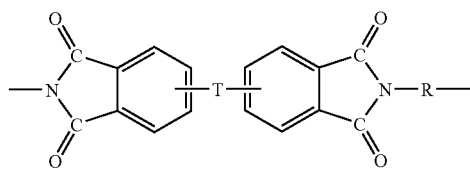

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II)

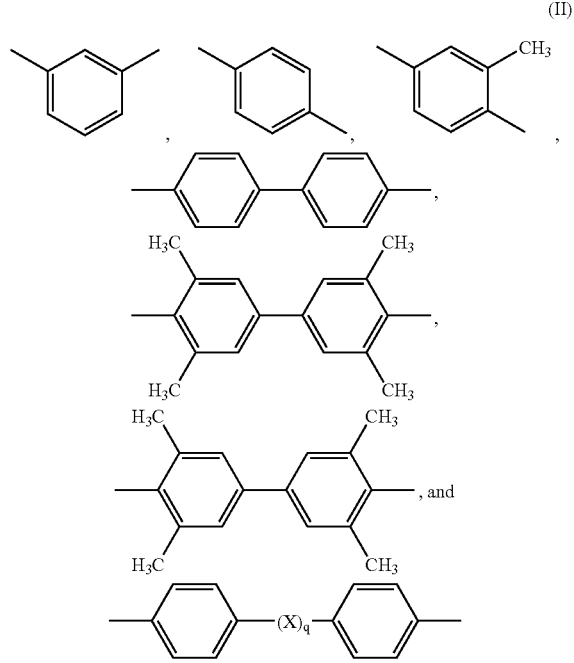

wherein X is a member selected from the group consisting of divalent radicals of the formulae (III)

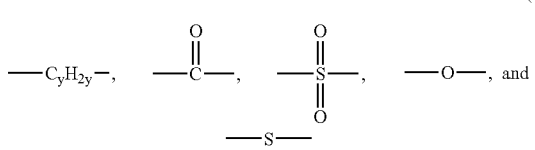 (III)

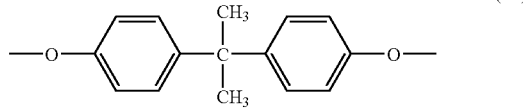 (VI)

wherein y is an integer of 1 to about 5, and q is 0 or 1; R is a divalent organic radical selected from (a) aromatic hydrocarbon radicals having 6 to about 20 carbon atoms and halogenated derivatives thereof, (b) alkylene radicals having 2 to about 20 carbon atoms, (c) cycloalkylene radicals having 3 to about 20 carbon atoms, and (d) divalent radicals of the general formula (IV)

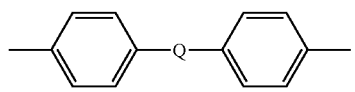 (IV)

where Q is a covalent bond or a member selected from the group consisting of formulae (V)

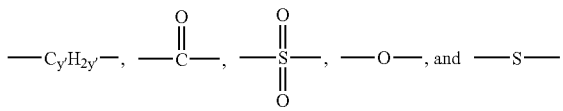 (V)

where y' is an integer from 1 to about 5.

In the formulas above, when X or Q comprises a divalent sulfone linkage, the polyetherimide may be considered a polyetherimide sulfone.

Generally, useful polyetherimides have a melt index of about 0.1 to about 10 grams per minute (g/min), as measured by American Society for Testing Materials (ASTM) D1238 at 337° C., using a 6.6 kilogram weight.

In a preferred embodiment, the polyetherimide resin has a weight average molecular weight of about 10,000 to about 150,000 atomic mass units (AMU), as measured by gel permeation chromatography using polystyrene standards. Such polyetherimide resins typically have an intrinsic viscosity greater than about 0.2 deciliters per gram measured in m-cresol at 25° C. An intrinsic viscosity of at least about 0.35 deciliters per gram may be preferred. Also, an intrinsic viscosity of up to about 0.7 deciliters per gram may be preferred.

Included among the many methods of making the polyetherimide resin are those described, for example, in U.S. Pat. No. 3,847,867 to Heath et al., U.S. Pat. No. 3,850,885 to Takekoshi et al., U.S. Pat. No. 3,852,242 and U.S. Pat. No. 3,855,178 to White, and U.S. Pat. No. 3,983,093 to Williams et al.

In a preferred embodiment, the polyetherimide resin comprises structural units according to formula (I) wherein each R is independently paraphenylene or metaphenylene and T is a divalent radical of the formula (VI).

A particularly preferred polyetherimide resin is the reaction product formed by melt polymerization of 2,2-bis[4-(3,4-dicarboxyphenoxy)phenyl]propane dianhydride with one or more of paraphenylene diamine and metaphenylene diamine. The polyetherimides are commercially available from General Electric Company as ULTEM® resins, including, for example, ULTEM® 1000, ULTEM® 1010, ULTEM® 6000, ULTEM® XH6050, and ULTEM® CRS5000. Additional description of polyetherimide polymers may be found, for example, in ASTM 5205, Standard Classification System for Polyetherimide (PEI) Materials.

Polysulfones suitable for use in the thermoplastic substrate are polymeric comprising repeating units having at least one sulfone group. Polysulfones and methods for their preparation are well known in the art and described, for example, in U.S. Pat. No. 3,642,946 to Grabowski et al.; and Kirk-Othmer, Encyclopedia of Chemical Technology, Second Edition, Vol. 16, pp. 272–281 (1968). Representative polymers of this type include polysulfones, polyether sulfones, and polyphenyl sulfones.

The polysulfones that may be utilized in the instant invention contain at least one recurring structural unit represented by the general formula (VII)

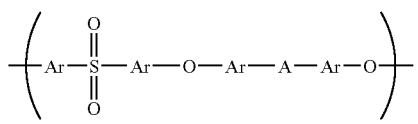 (VII)

wherein each occurrence of Ar is independently unsubstituted phenylene or phenylene substituted with phenyl, $C_1$–$C_{12}$ alkyl, $C_1$–$C_{12}$ alkoxy, halogen, nitro, or the like; and each occurrence of A is independently a direct carbon-to-carbon bond, $C_1$–$C_{12}$ alkylidene, $C_3$–$C_8$ cycloalkylidene, carbonyl sulfoxide, sulfur, sulfone, azo, imino, oxygen, or the like.

The polysulfones of Formula (VII) are preferably derived from dichlorodiphenyl sulfones reacted with bisphenols. A second group of sulfones represented by Formula I is one in which each Ar is phenylene and A is sulfone. A third major group of polysulfones represented by Formula I are those wherein each Ar is phenylene and A is oxygen, i.e., the polyarylethersulfones. When Ar is phenylene, it should preferably be either meta or para and may be substituted in the ring positions with $C_1$–$C_6$ alkyl groups, $C_1$–$C_6$ alkoxy groups, or the like. Particularly useful polysulfones are those derived from disulfonyl chlorides such as 4,4-biphenyldisulfonyl chloride reacted with 4,4'-dihydroxydiphenyl ether.

The polyarylethersulfones, including polyphenylene ether sulfones, contain at least the following recurring structural units

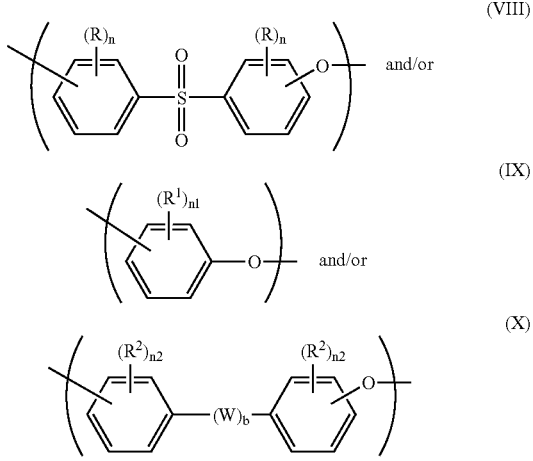

wherein R, $R^1$ and $R^2$ are independently selected from $C_1$–$C_6$ alkyl, $C_4$–$C_8$ cycloalkyl, and halogen radicals; W is a $C_2$–$C_8$ alkylene, a $C_1$–$C_8$ alkylidene, a cycloalkylene or cycloalkylidene radical containing from 4 to about 16 ring carbon atoms, or the like; b is 0 or 1; and n, n1, and n2 are independently 0, 1, 2, 3, or 4. Additional description of polysulfone may be found, for example, in ASTM D6394, Standard Specification for Sulfone Plastics (SP).

Suitable poly(arylene ether)s include polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

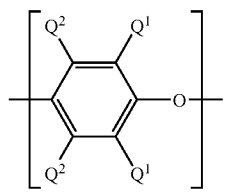

wherein for each structural unit, each $Q^1$ is independently halogen, primary or secondary $C_1$–$C_8$ alkyl, phenyl, $C_1$–$C_8$ haloalkyl, $C_1$–C8 aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_1$–$C_4$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Such copolymers of 2,6-dimethylphenol and 2,3,6-trimethylphenol, especially those containing about 5 to about 50 weight percent of units derived from 2,3,6-trimethylphenol, are particularly preferred for their heat resistance. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling. They typically contain at least one heavy metal compound such as a copper, manganese or cobalt compound, usually in combination with various other materials. Suitable methods for preparing poly(arylene ether)s are described, for example, in U.S. Pat. Nos. 3,306,874 and 3,306,875 to Hay, and U.S. Pat. Nos. 4,011,200 and 4,038,343 to Yonemitsu et al.

Suitable polycarbonates may be prepared by reacting a dihydric phenol with a carbonate precursor, such as phosgene, a haloformate, or a carbonate ester. Generally, such carbonate polymers possess recurring structural units of the formula

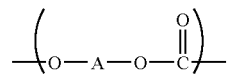

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) of about 0.30 to about 1.00 dL/g. The dihydric phenols employed to provide such aromatic carbonate polymers may be mononuclear or polynuclear aromatic compounds, containing as functional groups two hydroxy radicals, each of which is attached directly to a carbon atom of an aromatic nucleus. Typical dihydric phenols include, for example, 2,2-bis(4-hydroxyphenyl)propane (bisphenol A); hydroquinone; resorcinol; 2,2-bis(4-hydroxyphenyl)pentane; 2,4'-(dihydroxydiphenyl)methane; bis(2-hydroxyphenyl)methane; bis(4-hydroxyphenyl)methane; bis(4-hydroxy-5-nitrophenyl)methane; 1,1-bis(4-hydroxyphenyl)ethane; 3,3-bis(4-hydroxyphenyl)pentane; 2,2-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5- dimethyl-4-hydroxyphenyl)propane; 2,4'-dihydroxydiphenyl sulfone; 5'-chloro-2,4'-dihydroxydiphenyl sulfone; bis(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols suitable for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436 to Holub et al., or by transesterification processes such as are disclosed in U.S. Pat. No. 3,153,008 to Fox, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized blends of linear polycarbonate and a branched polycarbonate. Moreover, blends of any of the above materials may be employed in the practice of this invention to provide the aromatic polycarbonate.

These polycarbonates may be branched or linear and generally will have a weight average molecular weight of about 10,000 to about 200,000 AMU, preferably from about 20,000 to about 100,000 as measured by gel permeation chromatography. The polycarbonates of the invention can employ a variety of end groups to improve performance. Bulky monophenols, such as cumyl phenol, are preferred.

Suitable polycarbonates further include those derived from bisphenols containing alkyl cyclohexane units. Such polycarbonates have structural units corresponding to the structure

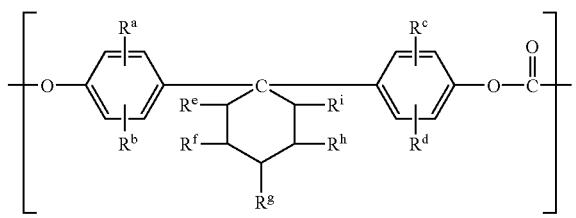

wherein $R^a$–$R^d$ are each independently hydrogen, $C_1$–$C_{12}$ hydrocarbyl, or halogen; and $R^e$–$R^i$ are each independently hydrogen, $C_1$–$C_{12}$ hydrocarbyl. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. Alkyl cyclohexane containing bisphenols, for example the reaction product of two moles of a phenol with one mole of a hydrogenated isophorone, are useful for making polycarbonate resins with high glass transition temperatures and high heat distortion temperatures. Such isophorone bisphenol-containing polycarbonates have structural units corresponding to the structure

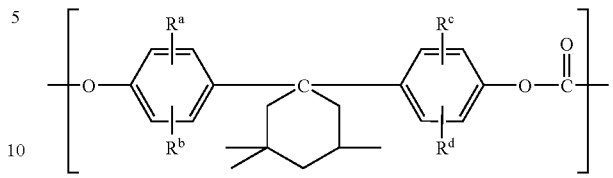

wherein $R^a$–$R^d$ are as defined above. These isophorone bisphenol based resins, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC trade name and described, for example, in U.S. Pat. No. 5,034,458 to Serini et al.

Suitable thermoplastic resins further include "polyarylates", which is the common term referring to polyesters of aromatic dicarboxylic acids and bisphenols. Polyarylate copolymers including carbonate linkages in addition to the aryl ester linkages, known as polyester-carbonates, are also suitable. These resins may be used alone or in combination with each other or more preferably in combination with bisphenol polycarbonates. These resins can be prepared in solution or by melt polymerization from aromatic dicarboxylic acids or their ester forming derivatives and bisphenols and their derivatives. Suitable dicarboxylic acids are iso- and terephthalic acid, their esters or acid chlorides. A preferred bisphenol is bisphenol A or its diacetate derivative. Polyester carbonates and polyarylates may also contain linkages derived from hydroxy carboxylic acids such as hydroxy benzoic acid. The most preferred polyester-carbonates and polyarylates are amorphous resins derived from bisphenol A and mixtures of isophthalic and terephthalic acid. Suitable polyarylates and their preparation are described, for example, in U.S. Pat. No. 4,663,421 to Mark. Suitable polyester-carbonates and their preparation are described, for example, in U.S. Pat. No. 3,169,121 to Goldberg, and U.S. Pat. No. 4,156,069 to Prevorsek et al.

In one embodiment, the substrate comprises at least about 50% by weight, preferably at least about 80% by weight, more preferably at least about 90% by weight, still more preferably at least about 95% by weight, of the thermoplastic resin.

In one embodiment the substrate comprises, in addition to the thermoplastic resin, an inorganic filler such as, for example, talc, mica, clay, titanium dioxide, zinc oxide, zinc sulfide, wollastonite, or the like, or a mixture thereof.

In another embodiment, the substrate is substantially free of inorganic filler. "Substantially free of inorganic filler" is defined herein as comprising less than 0.1 weight percent of inorganic filler. It may be preferred that the substrate comprises less than 0.01 weight percent of inorganic filler.

The substrate resin may further contain additives to improve melt processing, molding or part stability. Useful additives include lubricants and mold release agents, such as aliphatic esters, for example pentaerythritol tetrastearate, or polyolefins, for example high density polyethylene. Stabilizers, such as aryl phosphite and hindered phenols may also be blended with the substrate resin. Other additives include compounds to reduce static charge build up. If employed in the substrate, it is important to select such additives so that they are thermally stable, show low volatility and do not contribute to hazing in the metallized article.

In one embodiment, the amorphous thermoplastic also has a density less than 1.7 grams/milliliter (g/mL), preferably less than 1.6 g/mL, more preferably less than 1.5 g/mL. The density of the amorphous thermoplastic resin may be determined at 25° C. according to ASTM D792. The amorphous thermoplastic resin is thus less dense than bulk molding compounds that have often been used to form reflective articles. When the reflective article is a headlight reflector, the use of the amorphous resin reduces the weight of the headlight thereby contributes to weight reductions that allow more vehicle miles per gallon of fuel.

In one embodiment, the amorphous thermoplastic has an organic volatiles content less than 1,000 parts per million by weight, preferably less than 750 parts per million by weight, more preferably less than 500 parts per million by weight, measured according to ASTM D4526. As specified in ASTM D4526, the volatiles are determined by sampling a headspace in equilibrium with the thermoplastic at 90° C., and they are quantified using flame ionization detection. In this embodiment, the organic volatiles content is thus lower than that of bulk molding compounds, which may contain high concentrations of residual monomers that outgas at elevated temperatures and decrease the reflectivity of the reflective metal layer.

The dimensions of the substrate will be dictated by the use of the reflective article. For example, when the reflective article is a headlight reflector, it may have a thickness of about 0.1 to about 20 millimeters in the dimension perpendicular to the haze-prevention layer and the reflective metal layer; within this range, the thickness may preferably be at least about 0.5 millimeters, more preferably at least about 1 millimeter; also within this range, the thickness may preferably be up to about 10 millimeters, more preferably up to about 8 millimeters. As another example, when the reflective article is a data storage disc, it may have a thickness of about 0.1 to about 5 millimeters in the dimension perpendicular to the haze-prevention layer and the reflective metal layer; within this range, the thickness may preferably be at least about 0.5 millimeters, more preferably at least about 1 millimeter; also within this range, the thickness may preferably be up to about 4 millimeters, more preferably up to about 3 millimeters.

The reflective article comprises a reflective metal layer. Metals suitable for use in the reflective metal layer include the metals of Groups IIIA, IIIB, IVB, VB, VIB, VIIB, VIII, IB, and IIB of the periodic table. Mixtures and alloys of these metals may also be used. Preferred metals include aluminum, silver, gold, nickel, palladium, platinum, copper, and the like, and alloys comprising at least one of the foregoing metals. Aluminum and its alloys are particularly preferred metals for the reflective metal layer.

The reflective metal layer may be formed using methods known in the art, including sputtering, vacuum metal deposition, vapor arc deposition, plasma chemical vapor deposition, thermal vapor metal deposition, and ion plating.

The reflective metal layer may have a thickness of about 1 to about 1000 nanometers. Within this range, the thickness may preferably be at least about 10 nanometers, more preferably at least about 20 nanometers. Also within this range, the thickness may preferably be up to about 500 nanometers, more preferably up to about 200 nanometers.

The reflective article comprises a haze-prevention layer interposed between the substrate and the reflective metal layer. The haze-prevention layer comprises a metal having a tensile modulus of at least about $15 \times 10^6$ pounds per square inch, preferably at least about $20 \times 10^6$ pounds per square inch, more preferably at least about $30 \times 10^6$ pounds per square inch, measured at 25° C. according to ASTM D638.

Metals preferred for their high tensile modulus values include antimony, bismuth, cerium, chromium, cobalt, copper, iridium, iron, molybdenum, nickel, palladium, platinum, rhodium, tantalum, titanium, tungsten, vanadium, and alloys thereof. Particularly preferred metals for use in the haze-prevention layer include chromium and its alloys.

The haze-prevention layer may be formed using known metal coating methods, including, for example, sputtering, vacuum metal deposition, vapor arc deposition, plasma chemical vapor deposition, thermal vapor metal deposition, and ion plating.

In one embodiment, the haze-prevention layer comprises at least about 50 weight percent, preferably at least about 80 weight percent, more preferably at least about 90 weight percent, still more preferably at least about 95 weight percent of the high tensile modulus metal, based on the total weight of the haze-prevention layer.

The thickness of the haze-prevention layer will depend on its composition, but it is generally about 1 to about 1000 nanometers. Within this range, the thickness may preferably be at least about 20 nanometers, more preferably at least about 50 nanometers. Also within this range, the thickness may preferably be up to about 500 nanometers, more preferably up to about 200 nanometers.

Although the substrate is well suited for direct application of a haze-prevention layer, it is also possible to pre-coat the substrate with a primer before applying the haze-prevention layer. It may also be advantageous to further coat the reflective article with a clear layer to protect the reflective metal layer from scratching, oxidation, or related problems. The protective layer may, preferably, exhibit a percent transmittance greater than 90 percent measured nanometers according to ASTM D1003. The protective layer may, preferably, exhibit a yellowness index less than 5 measured according to ASTM D1925. Suitable compositions and methods for preparing protective metal oxide layers are described, for example, in U.S. Pat. No. 6,110,544 to Yang et al., and U.S. Pat. No. 6,379,757 B1 to Iacovangelo. Thus, in one embodiment, the reflective article includes a protective layer, wherein the haze-prevention layer is interposed between substrate and the reflective layer, and the reflective layer is interposed between the haze-prevention layer and the protective layer.

In a preferred embodiment, the reflective article comprises a surface having a reflectivity of at least 80%, more preferably at least about 85%, even more preferably at least about 90%, measured according to ASTM D523. In a highly preferred embodiment, the reflective article comprises a surface having a reflectivity of at least 80%, more preferably at least about 85%, even more preferably at least about 90%, after 15 minutes exposure to a temperature corresponding to the lowest heat distortion temperature of any thermoplastic resin in the substrate. The temperature at which a reflective article will resist hazing will be influenced by the nature of the thermoplastic substrate. With resins having a higher heat distortion temperature or glass transition temperature giving higher heat resistance. For a given resin substrate, use of a high modulus metal haze reducing layer, placed on the substrate and covered with second reflective metal layer, will provide greater resistance to haze formation than the use of a reflective layer alone.

It will be understood that the haze prevention layer and the reflective metal layer are distinct, and that it is not intended for a single metal layer to perform both functions. In one embodiment, the haze-prevention layer and the reflective layer have different compositions.

FIG. 1 presents an exploded perspective view of a section of a reflective article 10. Haze-prevention layer 40 is interposed between substrate 20 and reflective metal layer 30.

The reflective article may be used, for example, as an automotive headlight reflector, a reflector incorporated into a projector lamp, a mirror of any shape and curvature, or a data storage medium (e.g., an optically-readable data storage disc). Headlight reflectors and their preparation is described, for example, in U.S. Pat. No. 5,503,934 to Maas et al. and U.S. Pat. No. 6,355,723 B1 to van Baal et al. Data storage media and methods for their preparation are described, for example, in U.S. Pat. No. 5,783,653 to Okamoto et al., and U.S. Pat. No. 6,436,503 to Cradic et al., as well as U.S. Patent Application Publication Nos. 2002-0048691 A1 to Davis et al., 2002-0094455 A1 to Feist et al., 2002-0197438 A1 to Hay et al., and 2003-0044564 A1 to Dris et al.

In an embodiment preferred for its simplicity, the reflective article consists essentially of: a substrate comprising an amorphous thermoplastic resin having a heat distortion temperature of at least about 140° C. measured at 66 psi according to ASTM D648; a reflective metal layer; and a haze-prevention layer interposed between the substrate and the reflective metal layer, wherein the haze-prevention layer comprises a metal having a tensile modulus of at least about $15 \times 10^6$ pounds per square inch measured at 25° C. according to ASTM D638.

In a preferred embodiment, the reflective article comprises: a substrate comprising a polysulfone resin having a glass transition temperature of at least about 170° C.; a reflective metal layer comprising aluminum; and a haze-prevention layer interposed between the substrate and the reflective metal layer, wherein the haze-prevention layer comprises chromium and has a tensile modulus of at least about $30 \times 10^6$ pounds per square inch measured at 25° C. according to ASTM D638.

Another embodiment is a method for preparing a reflective article, comprising: applying a haze-prevention layer to a surface of a substrate, wherein the haze-prevention layer comprises a metal having a tensile modulus of at least about $15 \times 10^6$ pounds per square inch measured at 25° C. according to ASTM D638, and wherein the substrate comprises an amorphous thermoplastic resin having a heat distortion temperature of at least about 140° C. measured at 66 psi according to ASTM D648; and applying a reflective metal layer to a surface of the haze-prevention layer.

The invention is further illustrated by the following non-limiting examples.

COMPARATIVE EXAMPLE 1

A section of a 3.2 millimeter thick plaque of polyetherimide (ULTEM® 1010) was metallized by sputtering under vacuum with aluminum using a DC magnetron source set at 300 watts to form a reflective layer having a thickness of about 100–200 nanometers. The section was placed in a convection air oven set sequentially at 190, 200, and 215° C. After 15 minutes at 215° C., the reflective layer appeared hazy and blushed.

COMPARATIVE EXAMPLE 2

The procedure of Comparative Example 1 was followed, except that the polyetherimide plaque was coated by DC magnetron sputtering with a 60 nanometer thickness of gold prior to metallization with 100–200 nanometers of aluminum. Oven treatment of this sample produced results similar to those of the sample without gold: after 15 minutes at 215° C., the reflective layer appeared hazy and blushed.

COMPARATIVE EXAMPLE 3

The procedure of Comparative Example 2 was followed, except that the polyetherimide plaque coated by DC magnetron sputtering with a 60 nanometer layer of gold was not metallized with aluminum. Oven treatment of this sample produced results similar to those of the sample with gold and aluminum: after 15 minutes at 215° C., the reflective layer appeared hazy and blushed.

EXAMPLE 1

A 3.2 mm thick plaque of polyetherimide (ULTEM® 1010) was metallized by sputtering under vacuum with chromium using a DC magnetron source set at 300 watts to form a 15 nanometer chromium haze-reduction layer, which was subsequently coated with a 100–200 nanometer aluminum reflective layer. Haze was observed on the reflective layer after 30 minutes at 215° C. in the convection oven. The time to develop haze at 215° C. was doubled compared to Comparative Example 1 with a no haze reduction layer or to Comparative Example 3 with a gold layer under a reflective aluminum layer.

EXAMPLE 2

The procedure of Example 1 was followed, except that the thickness of the chromium haze reduction layer was increased to 100 nanometers. Haze was observed on the reflective layer after 75 minutes at 215° C. in the convection oven Comparing Example 1 to Example 2 shows that time to haze increases as a function of increasing chromium haze-prevention layer thickness.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A data storage medium, comprising:
   a substrate comprising an amorphous thermoplastic resin having a heat distortion temperature of at least about 140° C. measured at 66 pounds per square inch according to ASTM D648;
   a reflective metal layer; and
   a haze-prevention layer interposed between the substrate and the reflective metal layer, wherein the haze-prevention layer comprises a metal having a tensile modulus of at least about $15 \times 10^6$ pounds per square inch measured at 25° C. according to ASTM D638; wherein the haze-prevention layer comprises at least about 50 weight percent of a metal selected from antimony, chromium, cobalt, irridium, iron, molybdenum, nickel, palladium, platinum, rhenium, rhodium, tantalum, titanium, tungsten, and vanadium; and wherein the haze-prevention layer contacts the substrate and the reflective metal layer.

2. The data storage medium of claim 1, wherein the amorphous thermoplastic resin is selected from polyetherimides, polyetherimide sulfones, polysulfones, polyethersulfones, polyphenylene ether sulfones, poly (arylene ether)s, polycarbonates, polyester carbonates, polyarylates, and mixtures thereof.

3. The data storage medium of claim 1, wherein the amorphous thermoplastic resin comprises a polyetherimide.

4. The data storage medium of claim 1, wherein the substrate is substantially free of inorganic filler.

5. The data storage medium of claim 1, wherein the substrate has a thickness of about 0.1 to about 20 millimeters in a dimension perpendicular to the haze-prevention layer and the reflective metal layer.

6. The data storage medium of claim 1, wherein the substrate has a thickness of about 0.1 to about 5 millimeters in a dimension perpendicular to the haze-prevention layer and the reflective metal layer.

7. The data storage medium of claim 1, wherein the reflective metal layer comprises a metal selected from the group consisting of aluminum, silver, gold, nickel, palladium, platinum, copper, and alloys thereof.

8. The data storage medium of claim 1, wherein the reflective metal layer comprises aluminum.

9. The data storage medium of claim 1, wherein the reflective metal layer has a thickness of about 10 to about 1000 nanometers.

10. The data storage medium of claim 1, wherein the haze-prevention layer comprises chromium.

11. The data storage medium of claim 1, wherein the haze-prevention layer has a thickness of about 1 to about 1000 nanometers.

12. The data storage medium of claim 1, wherein the haze-prevention layer has a thickness of at least about 50 nanometers.

13. The reflective article of claim 1, further comprising a protective layer having a percent transmittance of at least 90% measured according to ASTM D1003; wherein the reflective layer is interposed between the haze-prevention layer and the protective layer.

14. The data storage medium of claim 1, comprising a surface with a reflectivity of at least 80% measured according to ASTM D523.

15. A data storage medium, comprising:
   a substrate comprising a polysulfone resin having a glass transition temperature of at least about 170° C.;
   a reflective metal layer comprising aluminum; and
   a haze-prevention layer interposed between the substrate and the reflective metal layer, wherein the haze-prevention layer comprises at least 50 weight percent chromium, and wherein the haze-prevention layer contacts the substrate and the reflective metal layer.

16. A method for preparing a data storage medium, comprising:
   applying a haze-prevention layer to a surface of a substrate, wherein the haze-prevention layer comprises a metal having a tensile modulus of at least about $15 \times 10^6$ pounds per square inch measured at 25° C. according to ASTM D638; wherein the haze-prevention layer comprises at least about 50 weight percent of a metal selected from antimony, chromium, cobalt, iridium, iron, molybdenum, nickel, palladium, platinum, rhenium, rhodium, tantalum, titanium, tungsten, and vandium; and wherein the substrate comprises an amorphous thermoplastic resin having a heat distortion temperature of at least about 140° C. measured at 66 pounds per square inch according to ASTM D648; and
   applying a reflective metal layer to a surface of the haze-prevention layer.

* * * * *